United States Patent
Normand et al.

(10) Patent No.: US 12,415,968 B2
(45) Date of Patent: Sep. 16, 2025

(54) SHELF STABLE SPRAY DRIED PARTICLES

(71) Applicants: FIRMENICH SA, Satigny (CH); Kyle Subramaniam, Hightstown, NJ (US)

(72) Inventors: Valery Normand, Plainsboro, NJ (US); Alison Rada, Plainsboro, NJ (US); Amanda Schober, Plainsboro, NJ (US); Anandaraman Subramaniam, Plainsboro, NJ (US); Robert L. Veazey, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 962 days.

(21) Appl. No.: 16/592,973

(22) Filed: Oct. 4, 2019

(65) Prior Publication Data

US 2020/0032162 A1 Jan. 30, 2020

Related U.S. Application Data

(63) Continuation of application No. 14/765,786, filed as application No. PCT/EP2014/051975 on Feb. 3, 2014, now abandoned.

(60) Provisional application No. 61/760,591, filed on Feb. 4, 2013.

(51) Int. Cl.
| | | |
|---|---|---|
| *C11B 9/00* | (2006.01) | |
| *A23L 27/00* | (2016.01) | |
| *G06Q 10/00* | (2023.01) | |
| *G06Q 30/06* | (2023.01) | |

(52) U.S. Cl.
CPC ............... *C11B 9/00* (2013.01); *A23L 27/70* (2016.08); *A23L 27/80* (2016.08); *G06Q 10/00* (2013.01); *G06Q 30/06* (2013.01); *A23V 2002/00* (2013.01)

(58) Field of Classification Search
CPC .................................. A23L 27/80; A23L 27/70
See application file for complete search history.

(56) References Cited

U.S. PATENT DOCUMENTS

| | | |
|---|---|---|
| 2,432,759 A | 12/1947 | Heyman |
| 4,276,312 A | 6/1981 | Merritt |
| 5,897,897 A | 4/1999 | Porzio et al. |
| 6,537,595 B1 | 3/2003 | Hyodo et al. |
| 6,723,359 B2 | 4/2004 | Subramaniam et al. |
| 2006/0159818 A1 | 7/2006 | Kunieda |
| 2007/0116837 A1 | 5/2007 | Prakash et al. |
| 2008/0044551 A1 | 2/2008 | Subramaniam |
| 2008/0102131 A1 | 5/2008 | Nagira et al. |
| 2009/0004304 A1 | 1/2009 | Ikehara et al. |
| 2009/0253612 A1 | 10/2009 | Mushock et al. |

(Continued)

FOREIGN PATENT DOCUMENTS

| | | |
|---|---|---|
| WO | 2006082536 A1 | 8/2006 |
| WO | 2011121468 A1 | 10/2011 |

OTHER PUBLICATIONS

International Search Report and Written Opinion for International Application No. PCT/EP2014/051975, dated Jun. 20, 2014, 10 pages.

Anandaraman, "Encapsulation, analysis and stability of orange peel oil", University of Minnesota PhD Thesis, 1984, 196 pages, University Microfilms International, Ann Arbor, MI.

(Continued)

*Primary Examiner* — Katherine D Leblanc
(74) *Attorney, Agent, or Firm* — Armstrong Teasdale LLP (57) ABSTRACT

A process for the preparation of shelf stable dry particles that include flavours or fragrances, in which an emulsion of the flavour or fragrance, an emulsifier of a natural extract containing saponins, water and a carbohydrate carrier system is spray-dried. Also provided are shelf stable dry particles and products containing them.

16 Claims, 7 Drawing Sheets

(56) References Cited

U.S. PATENT DOCUMENTS

| | | |
|---|---|---|
| 2010/0034956 A1 | 2/2010 | Yasumi et al. |
| 2011/0059205 A1 | 3/2011 | Gaysinsky et al. |
| 2012/0083530 A1 | 4/2012 | Mai et al. |
| 2012/0231122 A1 | 9/2012 | Tran |
| 2012/0322750 A1 | 12/2012 | Schrader et al. |
| 2013/0004615 A1 | 1/2013 | Bouquerand et al. |
| 2013/0022728 A1 | 1/2013 | Popplewell et al. |
| 2014/0193562 A1 | 7/2014 | Popplewell et al. |
| 2014/0205688 A1 | 7/2014 | Takahashi et al. |
| 2016/0165937 A1 | 6/2016 | Normand et al. |

OTHER PUBLICATIONS

Anandaraman et al., "Stability of Encapsulated Orange Peel Oil," Food Technology, 1986, pp. 88-93, vol. 40.

MOCON webinar article, "Shelf Life Studies: Basics, Principles, and Concepts", 2015, 2 pages, Article: PPS 25-5102, URL: https://www.mocon.com/assets/documents/pps-25-5102-shelf-life-studies.pdf, MOCON Inc., Minneapolis, MN.

Subramaniam et al., "Orange oil stability in spray dry delivery systems", Carbohydrate Polymers, 2013, pp. 352-357, vol. 97.

Yoshii et al., "Flavor release from spray-dried maltodextrin/gum arabic or soy matrices as a function of storage relative humidity", Innovative Food Science & Emerging Technologies, 2001, pp. 55-61, vol. 2.

Fang et al., "Tea Beverage Production Technology", 2001, p. 248, China Light Industry Press.

Biliaderis et al., "Potential Use of Carbohydrates as Stabilizers and Delivery Vehicles of Bioactive Substances in Foods", Functional Food Carbohydrates, 2006, pp. 520-522, CRC Press, Boca Raton.

SHELF STABLE SPRAY DRIED PARTICLES

CROSS-REFERENCE TO RELATED APPLICATIONS

This application is a continuation of U.S. patent application Ser. No. 14/765,786, filed on Aug. 4, 2015, which is a U.S. National Phase Entry of International Application Number PCT/EP2014/051975, filed Feb. 3, 2014, and claims the benefit of priority to U.S. Provisional Application No. 61/760,591, filed Feb. 4, 2013, the entire contents of each being hereby incorporated by reference herein.

TECHNICAL FIELD

The technical field relates to a process for the preparation of dry particles comprising flavours, in which an emulsion comprising flavour or fragrance, a natural extract comprising saponins, water and a carbohydrate carrier system is spray-dried. The technical further relates to the dry particles as such and to products containing them.

BACKGROUND

Spray-dried products are commonly prepared from an emulsion that is sprayed into a drying chamber. Some emulsions may comprise flavours or fragrances—a carrier and an emulsifier. A number of emulsion parameters influence the quality of the spray-dried solid capsules. In particular, it is well-known to the person skilled in the art of spray-drying that it is desirable to spray-dry a good emulsion, as defined by relatively small droplet size of a discontinuous phase, the emulsion also particularly remaining stable during the whole duration of the spray-drying process, taking into account that, depending on the manufacturing set up, the time-delay between emulsion preparation and actual spray-drying can vary from a few minutes to several hours. The stability of the droplet size in the emulsion is even more important and difficult to achieve when high amounts of flavours or fragrances are intended to be encapsulated.

Spray dried particles are commonly made using polymeric emulsifiers (e.g. octenyl succinylated starches (OSS) and Gum Arabic). These are high molecular weight emulsifiers that are detrimental to the density of the glassy system by promoting free volume. The benefit associated with high molecular weight molecules in the matrix is that they bring physical stability under humid air conditions. Finished spray dried powders have a relatively high glass transition temperature (Tg>30° C.) due to their low water content. Caking, or physical stability, is therefore not an issue with spray dried flavours except for fruit juice powders as low molecular weight sugars and acids are present in fruit juice compositions.

US 2009/0253612 describes a spray-dry encapsulation process for flavour or fragrance comprising drying an aqueous emulsion containing the oil to be encapsulated, modified starch and phosphate salts. Hidefumi et al. (Innovative Food Science & Emerging Technologies, 2 (2001), pp. 55-61) discloses a process for the microencapsulation of emulsified ethyl butyrate by spray-drying using maltodextrin as carrier and gum arabic as emulsifier.

Due to loss or oxidation of the flavour, the shelf life of conventional products based on octenyl succinated starches and maltodextrin matrices is not more than 18 months. For citrus flavours, which are especially sensitive to oxygen, the shelf life is even shorted, namely, and does not exceed 12 months.

To solve this problem, gum arabic has been reported to replace low molecular weight emulsifiers such as fatty acids or glycerol esters. For example, WO 2006/082536 reports a method for the preparation of a spray-dried powder, which comprises the steps of emulsifying the active ingredient in a gum arabic and non-ionic emulsifier mixture, homogenizing the emulsion and spray-drying the latter to form a particulate product. The non-ionic emulsifiers may be a low molecular weight emulsifier such as di-acetyl tartaric acid esters of mono and diglycerides, such as DATEM® or CITREM®. However, a drawback of the low molecular weight emulsifiers is that they tend to stick to spray-drier chamber walls and to the surface of other particles in the spray-drier when they are used in sufficient amounts to reduce the viscosity of the emulsion.

It has been shown that the shelf life of spray dried powders is limited by the oxidative stability of the oil and/or by the loss of oil during storage. The need to understand and control the oxygen barrier properties of spray dried products is high in order to provide the desired stability in application. Stability control is possible by including anti-oxidant ingredients in the formulation or by physically slowing down the permeability of the oxygen. One way to slow down oxygen permeability is to increase the density of the glass by lowering the molecular weight of the carrier system while still maintaining good protection against humidity. One of the most common ways of achieving a low molecular weight matrix while still remaining cost effective is to add sucrose to maltodextrin.

The molecular weight can also be lowered by eliminating the polymeric emulsifier or replacing it with an emulsifier that does not interfere with the basic properties of the matrix, such as Q-NATURALE™. An aqueous extract of the bark of the soap bark tree (*Quillaja sapanaria*), Q-NATURALE™ is an example of a natural saponin-containing emulsifier [15-17]. Saponins are powerful emulsifiers that can be used at very low concentrations to make spray dry pre-emulsions that are stable in the high shear generated at the spray dry nozzle. As a natural extract, Q-NATURALE™ is particularly advantageous to provide a spray-dried product in which every component can be obtained from a natural source, thus satisfying the consumers' request for natural products.

Thus, there is a need in the industry for shelf stable flavour compositions.

SUMMARY

Accordingly, provided herein is a process for preparing shelf stable dry particles wherein the process comprises:
 a) preparing an emulsion comprising
  i) an emulsifier in an amount, by weight, from greater than 0% to about 1% of the total weight of the emulsion wherein the emulsifier comprises a natural extract containing saponins;
  ii) a carbohydrate in an amount, by weight, from about 5 to about 55% of the total weight of the emulsion wherein the carbohydrate has a number average molecular weight of from 445 to about 687 g·mol$^{-1}$;
  iii) an oxidizable flavor or fragrance in an amount, by weight, from about 5 to about 60% of the total weight of the emulsion; and
  iv) a polymeric emulsifier in an amount, by weight, not more than 10% of the total weight of the emulsion;
 b) spray-drying the emulsion obtained in step a) so as to obtain shelf stable dry particles.

Also provided herein is a business method for providing a customer with a spray dried powder with a predetermined shelve life stability comprising:
  a) preparing a series of samples of at least two emulsions wherein each emulsion comprises
    i) a monomeric or polymeric emulsifier in an amount, by weight, from greater than 0% to about 6% of the total weight of the emulsion;
    ii) a carbohydrate in an amount, by weight, from about 5% to about 55%, of the total weight of the emulsion wherein the carbohydrate has a different molecular weight distribution in each emulsion;
    iii) an oxidizable flavor or fragrance in an amount, by weight, from about 5% to 60%, of the total weight of the emulsion; and
    iv) water in an amount, by weight, from about 15 to 80% of total weight of emulsion;
  b) submitting the samples to a sensory shelf life stability test to determine the shelf life stability for each sample;
  c) measuring or calculating the number average molecular weight of the carbohydrate, and of the emulsifier, for each sample;
  d) correlating the shelf life stability over time against the inverse of the number average molecular weight of the carbohydrates and the emulsifier for each sample;
  e) selecting a carbohydrate having the number average molecular weight that correlates with a shelf life of 8 months or greater at 25° C.;
    providing at least one product to a customer having a shelf life stability of greater than or equal to about 8 months or greater wherein the product comprises a spray dried powder with the selected carbohydrate.

Further provided herein is an emulsion comprising:
  (1) an emulsifier in an amount, by weight, from greater than 0% to about 1% of the total weight of the emulsion wherein the emulsifier comprises a natural extract containing saponins;
  (2) a carbohydrate in an amount, by weight, from about 5 to about 55% of the total weight of the emulsion wherein the carbohydrate has a number average molecular weight of from 445 to about 687 g·mol$^{-1}$;
  (3) an oxidizable flavor or fragrance in an amount, by weight, from about 5 to about 60% of the total weight of the emulsion; and
  (4) water in an amount, by weight, from 15 to 80% of the total weight of the emulsion; and
  (5) a polymeric emulsifier in an amount, by weight, not more than 10% of the total weight of the emulsion.

In another aspect provided herein is a dry particle comprising:
  (1) an emulsifier in an amount, by weight, from greater than 0% to about 1% of the total weight of the dry particle wherein the emulsifier comprises a natural extract containing saponins;
  (2) a carbohydrate in an amount, by weight, from about 5 to about 55% of the total weight of the dry particle wherein the carbohydrate has a number average molecular weight of from 445 to about 687 g·mol$^{-1}$;
  (3) an oxidizable flavor or fragrance in an amount, by weight, from about 5 to about 60% of the total weight of the dry particle; and
  (4) a polymeric emulsifier in an amount, by weight, not more than 10% of the total weight of the dry particle.

BRIEF DESCRIPTION OF THE FIGURES

FIGS. 1a and b are graphs showing sum of oxidation products of limonene in spray dry samples of various molecular weights at 32° C. as disclosed in the prior art (a) and sum of oxidation products of limonene in the samples of the present study at 35° C. as a function of the square root of time (b). Diamonds are for orange oil oxidation in carrier molecular weight 1081 g·mol-1 obtained by mixing 18DE and low molecular weight OSS, squares are for oxidation of orange oil in carrier molecular weight 655 g·mol-1 made of 38% w/w sucrose and 62% w/w 10DE maltodextrin, and triangles are for orange oil oxidation in carrier molecular weight 557 g·mol-1 made of 50% w/w sucrose and 50% w/w 10DE maltodextrin.

FIGS. 6a and b are graphs showing shelf life stability at 20° C. (a) and at 25° C. (b) for spray dry delivery systems produced using pure maltodextrins (open triangles), combination of maltodextrin and sucrose (diamonds), conventional carrier systems (squares), pure glucose syrups (asterisks) and maltose Gum Arabic (circles).

DESCRIPTION

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of".

The carbohydrates provided herein are suitable for use as a carrier system in the process of making the emulsions and dry particles.

In some embodiments, the carbohydrate comprises maltodextrin,

In another embodiment provided herein the carbohydrate is a glucose syrup.

In another embodiment, the carbohydrate carrier system comprises a mixture of maltodextrin and sucrose in a 2:1 ratio.

The carbohydrate carrier system is particularly used in an amount of from 10 to 50% by weight, more particularly from 35 to 45% by weight, relative to the total weight of the emulsion.

In a further embodiment, the carbohydrate has a number average weight of from about 445 to about 687 g·mol$^{-1}$.

In another embodiment, the carbohydrates have a particular Dextrose Equivalent (DE) value of from 25 to 30. In an embodiment of the provided herein, the carbohydrate carrier has a dextrose equivalent (DE) value between 25 and 30. Dextrose equivalent (DE) is a measure of the amount of reducing sugars present in a sugar product, relative to glucose, expressed as a percentage on a dry basis. For example, a maltodextrin with a DE of 10 would have 10% of the reducing power of dextrose (which has a DE of 100). Maltose, a disaccharide made of two glucose (dextrose) molecules has a DE of 52, correcting for the water loss in molecular weight when the two molecules are combined (180/342). Sucrose actually has a DE of 0 even though it is a disaccharide, because both reducing groups of the monosaccharides that make it are connected, so there are no remaining reducing groups. For solutions made from starch, it is an estimate of the percentage reducing sugars present in the total starch product.

In all glucose polymers, from the native starch to glucose syrup, the molecular chain begins with a reducing sugar, containing a free aldehyde. As the starch is hydrolysed, the molecules become shorter and more reducing sugars are present. The DE describes the degree of conversion of starch to dextrose. In particular, starch has a DE value close to 0 while glucose/dextrose has a DE value of 100. The DE value of maltodextrins varies between 3 and 20 while glucose syrups have a DE value more than 20.

Emulsifiers provided herein may be selected from monomeric and polymeric emulsifiers. Suitable emulsifiers include, but are not limited to, lecithins, gum arabic, octenyl succinated starches, and saponins. Saponins are amphiphilic glycosides composed of one or more hydrophilic glucoside moiety combined with a lipophilic triterpene derivative. Saponins are present in diverse plant extracts. The term "natural extract comprising saponins" refers to any saponin or mixture of substances comprising saponins obtained by applying a physical separation process to a raw material that is available in nature. Particular natural extracts are those comprising at least 10% by weight, more particularly at least 20% by weight, even more particularly at least 50% by weight, most particularly at least 80% by weight, relative to the total weight of the extract, of saponins Particular natural extracts that can be used herein may comprise plant extracts, such as quillaja extract, camellia seeds extract, achyranthe extract, glycyrrhizine and stevia. Quillaja extract, which is obtained from the bark of *Quillaja saponaria* is particular embodiment provided herein. Such plant extracts are commercially available from a number of suppliers. For example, quillaja extract can be purchased in a dilute form from National Starch under the tradename Q-NATURALE™ (*Quillaja* extract in water).

In one aspect, the extract is used in an amount, by weight, of from greater than 0% up to about 1%, e particularly from 0.6 up to 1%, more particularly about 0.6%, relative to the total weight of the emulsion or dry particle.

Provided herein are flavouring and/or perfuming ingredients that are subject to oxidation ("oxidizable") and encompass both flavour and fragrance ingredients or compositions of current use in the flavor and/or fragrance industry, including those of natural or synthetic origin and in the form of single compounds or mixtures thereof. Specific examples of such flavour and/or fragrance ingredients may be found in the current literature, e.g. in Fenaroli's Handbook of flavour ingredients, 1975, CRC Press; Synthetic Food adjuncts, 1947 by M. B. Jacobs, edited by Van Nostrand; or Perfume and Flavor Chemicals by S. Arctander, 1969, Montclair, New Jersey (USA). Many other examples of current flavouring and/or perfuming ingredients may be found in the patent and general literature available. The flavouring and/or perfuming ingredients may be present in the form of a mixture with solvents, adjuvants, additives and/or other components, generally those of current use in the flavour and fragrance industry.

"Flavouring ingredients" as used herein are compounds that are well known to a person skilled in the art of aromatising as those that are capable of imparting a flavour or taste to a consumer product, or of modifying the taste and/or flavour of the consumer product, or yet its texture or mouthfeel.

The term "perfuming ingredients" is understood to mean compounds which are used as active ingredients in perfuming preparations or compositions in order to impart a hedonic effect when applied on a surface. In other words, such compounds, to be considered as being perfuming ones, must be recognized by a person skilled in the art of perfumery as being able to impart or modify in a positive or pleasant way the odor of a composition or of an article or surface, and not just as having an odor. Moreover, this definition is also meant to include compounds that do not necessarily have an odor but are capable of modulating the odor of a perfuming composition, perfumed article or surface and, as a result, of modifying the perception by a user of the odor of such a composition, article or surface. It also contains malodor counteracting ingredients and compositions. By the term "malodor counteracting ingredient" we mean here compounds which are capable of reducing the perception of malodor, i.e., of an odor that is unpleasant or offensive to the human nose by counteracting and/or masking malodors. In a particular embodiment, these compounds have the ability to react with key compounds causing known malodors. The reactions result in reduction of the malodor materials' airborne levels and consequent reduction in the perception of the malodor.

In particular, the flavor and/or fragrance provided herein are a flavor or fragrance that is subject to oxidation ("oxidizable). Flavours and/or fragrance characterized by a log P value of 2 or more are particularly embodiments provided herein.

Flavours that are derived from or based fruits where citric acid is the predominant, naturally-occurring acid include but are not limited to, for example, citrus fruits (e.g., lemon, lime), limonene, strawberry, orange, and pineapple. In one embodiment, the flavours food is lemon, lime or orange juice extracted directly from the fruit. Further embodiments of the flavour comprise the juice or liquid extracted from oranges, lemons, grapefruits, key limes, citrons, clementines, mandarins, tangerines, and any other citrus fruit, or variation or hybrid thereof. In a particular embodiment, the flavour comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a particular embodiment, the flavour comprises a composition that comprises limonene, in a particular embodiment, the composition is a citrus that further comprises limonene.

In further embodiments, the flavour and/or fragrance is provided in an amount, by weight, of from used in an amount of from about 7 to about 30% by weight, more particularly from 10 to 30%% by weight, and even more particularly about 30%, by weight, relative to the total weight of the emulsion or dry particle.

The emulsion may also contain optional ingredients. It may in particular further contain an effective amount of a fireproofing or explosion suppression agents. The type and concentration of such agents in spray-drying emulsions is known to the person skilled in the art. One can cite as non-limiting examples of such fireproofing or explosion suppression agents inorganic salts, C1-C12 carboxylic acids, salts of C1-C12 carboxylic acids and mixtures thereof. Particular explosion suppression agents are, salicylic acid, acetic acid, propionic acid, butyric acid, isobutyric acid, valeric acid, caproic acid, citric acid, succinic acid, hydroxysuccinic acid, maleic acid, fumaric acid, oxylic acid, glyoxylic acid, adipic acid, lactic acid, tartaric acid, ascorbic acid, the potassium, calcium and/or sodium slats of any of the afore-mentioned acids, and mixtures of any of these. Other optional ingredients include antioxidants, colorants and dyes.

The emulsion can be formed using any known emulsifying method, such as high shear mixing, sonication or homogenization. Such emulsifying methods are well known to the person skilled in the art.

The droplet size d(v,0.9) of the emulsion is particularly comprised between 1 and 15/lm, more particularly between 1 and 10/lm and even more particularly between 1 and 20/lm. More particularly, the droplet size remains within the range for at least one day storage at ambient temperature (25° C.).

The viscosity of the emulsion is particularly between 20 and 300 mPas, more particularly between 70 and 200 mPas and even more particularly between 100 and 150 mPas at the temperature at which the atomization step, as defined below, is conducted.

After the emulsion is prepared, it is then spray-dried so as to obtain dry particles. The spray-drying process comprises two steps, the first one being dispersion and the second one being drying. The emulsion is first subjected to an atomization step, during which the emulsion is dispersed in the form of drops into a spraying tower. Any device capable of dispersing the emulsion in the form of drops can be used to carry out such dispersion. For instance, the emulsion can be guided through a spraying nozzle or through a centrifugal wheel disk into the spraying tower. Vibrated orifices may also be used. The size of the capsules is determined by the size of the drops that are dispersed into the tower. If a spraying nozzle is used for dispersing the drops the size may be controlled by the flow rate of an atomising gas through the nozzle, for example. In the case where a centrifugal wheel disk is used for dispersal, the main factor for adjusting droplet size is the centrifugal force with which the drops are dispersed from the disk into the tower. The centrifugal force, in turn, depends on the speed of rotation and the diameter of the disk. The feed flow rate of the emulsion, its surface tension and its viscosity are also parameters controlling the final drop size and size distribution. By adjusting these parameters, the skilled person can control the size of the drops of the emulsion to be dispersed in the tower.

Once sprayed in the chamber, the droplets are dried using any technique known in the art. These methods are perfectly documented in the patent and non-patent literature in the art of spray-drying. For example, Spray-Drying Handbook, 3rd ed., K. Masters; John Wiley (1979), describes a wide variety of spray-drying methods.

A process provided herein may be performed in any conventional spraying tower. A conventional multi-stage drying apparatus is for example appropriate for conducting the steps of this process. It may comprise a spraying tower, and, at the bottom of the tower, a fluidised bed intercepting partially dried particles after falling through the tower.

Provided here are dry particles obtainable and/or obtained by the process described above. The obtained dry particles typically comprise (i) from 0.5 to 30% of a natural extract comprising saponins; (ii) from 15 to 95% of a carbohydrate carrier system, and (iii) from 5 to 75% of flavour, the percentages being defined by weight, relative to the total weight of the dry particles. The term "dry" indicates that almost all the water in the emulsion has been evaporated during the spray drying step that the water content in the dry particles are negligible, typically below 0.5 wt %, particularly below 0.3 wt %, and most particularly below 0.2 wt % of the dry particle.

In a particular embodiment, the size of the particles is typically between 20 and 200/lm, more particularly between 50 and 100/lm, and even more particularly from 75 to 85/lm. The dry particles have satisfying storage stability, even at 60% relative humidity.

In another embodiment, provided herein is a food product comprising the dry particles disclosed herein. When the food product is a particulate or powdery food, the dry particles may easily be added thereto by dry-mixing. Typical food products are selected from the group consisting of an instant soup or sauce, a breakfast cereal, a powdered milk, a baby food, a powdered drink, a powdered chocolate drink, a spread, a powdered cereal drink, a chewing gum, an effervescent tablet, a cereal bar, and a chocolate bar. The powdered foods or drinks may be intended to be consumed after reconstitution of the product with water, milk and/or a juice, or another aqueous liquid.

The dry particles provided herein may be suitable for conveying flavors to beverages, fluid dairy products, condiments, baked goods, frostings, bakery fillings, candy, chewing gum and other food products.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

The following examples are illustrative only and are not meant to limit the Summary, Description or Claims provided herein.

EXAMPLES

Experiments were conducted along with a careful analysis of published data on oxidation of orange oil in spray dried powders. The results of the experiments support a correlation between the shelf life (determined by a sensory panel and GC-MS measurements of oxidation products) and the number average molecular weight of the carrier carbohydrate used to encapsulate the flavour. First, the rate of oxidation products generation has been shown to correlate with the rate of oxygen concentration increase in the matrix (FIG. 2), exclusively based on Refs #12 and 13. Second, the rate of oxidation products generation has been correlated to the sensory analysis performed and reported in Ref #13 at three different temperatures and extrapolated to other temperatures using Arrhenius. Third, an accelerated shelf life test has been developed to probe the rate of oxidation in the dry particles within 13 days assuming that the concentration of oxygen in the matrix will never be a limiting factor for oxygen to diffuse from outside to inside. Fourth, regardless of the matrix composition, all oxidation rates led to a corresponding shelf life. When the log(Shelf life) is reported as a function of the apparent Dextrose Equivalent (100/(degree of polymerization)), a straight line is observed that does not depend on the matrix composition. Surprisingly, pure maltopolymers ranging from low DE maltodextrins to high DE corn syrups, mixtures of maltodextrins of various DE and sucrose or maltose or glucose monohydrate, mixtures of octenyl succinated starchs and maltodextrin and small sugars, Gum Arabic and maltose, all belong to the same family. Finally, using apparent DEs of 22.7 and over insures stability on shelf for more than 6 months whereas the products on the market measured using this technique have a maximum shelf life of 4 months if no antioxidant is used (see FIG. 7b). As shown in the Table 1 below, sensory analysis also confirms that the flavor from the samples containing the presently claimed shelf stable dry particles was fresher for a longer time than those containing spray-dried powders based on conventional matrices.

TABLE 1

| Product | | Sensory | Calculation shelf life | Analytical shelf life | |
|---|---|---|---|---|---|
| Mn | age (days) | evaluation comments | estimated (days) | measured (days) | Rating |
| 1612.39 | 46 | orange peel, flat, missing top notes, very cloudy in water | 24 | 27 | Not good |
| 1612.39 | 213 | oxidized orange, bitter, cloudy | 24 | 27 | Bad |
| 708.42 | 46 | fresh, juicy, sweet, clear solution, best tasting sample | 202 | 190 | Very good |
| 708.42 | 203 | peely, slightly bitter although not oxidized, flat, cloudy | 202 | 190 | Good |
| 729.79 | 46 | fresh, juicy, sweet, clear solution, best tasting sample | 181 | 165 | Very good |
| 729.79 | 203 | peely, slightly bitter although not oxidized, flat, cloudy | 181 | 165 | Slightly good |

The sensory analysis was done by four trained panellists and using a beverage application containing 250 ppm flavour comprising 5% sucrose and citric acid 0.25%.

Materials

The number average molar mass ($M_n$) was measured using freezing point osmometry for pure maltodextrins, modified starches and glucose syrup. Q-NATURALE™ (M=1650 g·mol$^{-1}$) and octenyl succinated starches of two different $M_n$ (4443 and 1916 g·mol$^{-1}$) were purchased from INGREDION™ (Bridgewater, NJ). Maltodextrins 18DE ($M_n$=1031 g·mol$^{-1}$), 10DE ($M_n$=1505 g·mol$^{-1}$) and 5DE ($M_n$=2446 g·mol$^{-1}$) were purchased from Cargill (Hammond, IN). Crystalline sucrose (M=342 g·mol$^{-1}$) was obtained from Domino Imperial Sugar (Miami, FL). Glucose syrup solid 25DE ($M_n$=730 g·mol$^{-1}$) and 20DE ($M_n$=886 g·mol$^{-1}$) were purchased from Grain Processing Corporation (Muscatine, IA).

Sample Preparation

A horizontal box dryer (Ernest D. Menold Inc., Lester, PA) equipped with high pressure homogenization and high pressure nozzle atomization was used to produce the prototypes. Carbohydrates (maltodextrin, glucose syrup and sucrose) were incorporated in water. Q-NATURALE™ was introduced as a liquid solution (22% w/w dry) and ranged from 0.06 to 0.66% w/w solid concentration in the final product. Orange oil was added and the solution was stirred using a LIGHTNIN® mixer (Lightnin, Rochester, NY). The feed was homogenized at 70 bars and atomization pressure was maintained at 70 bars. Inlet and outlet temperatures of the dryer were maintained at 170° C. and 72° C., respectively. A summary of the components and their amounts used in the samples is provided in Table 2.

TABLE 2

| | Mn | | 4150.653 4DE | 2446 5DE | 1758.064 10DE a | 1505 10DE b | 1031 18DE | 982.2867 20DE a | 886.72 20DE b | 800.6087 25DE a | 730.5 25DE b | 511.9024 36DE | 342 Sucrose |
|---|---|---|---|---|---|---|---|---|---|---|---|---|---|
| ALE04 | 6 | ■ | | | | 75 | | | | | | | |
| ALE51 | 7 | ■ | | | | | 75 | | | | | | |
| VRN3 | 12 | ♦ | | | | 34.86 | | | | | | | 34.86 |
| VRN4 | 13 | ♦ | | | | 34.73 | | | | | | | 34.73 |

TABLE 2-continued

| | # | Sym | | | | | | |
|---|---|---|---|---|---|---|---|---|
| VRN5 | 14 | ♦ | 26.49 | | 8.37 | | | 34.86 |
| VRN6 | 8 | ■ | | 31.50 | | | | 31.50 |
| VRN3(2) | 15 | ♦ | | 34.86 | | | | 34.86 |
| VRN7 | 16 | ♦ | | 55.77 | | | | 13.94 |
| VKN8 | 17 | ♦ | | 45.32 | | | | 24.40 |
| VRN9 | 9 | ■ | | 51.10 | | | | 14.00 |
| VRN10 | 10 | ■ | | 40.60 | | | | 24.50 |
| VRN11 | 18 | ♦ | | 69.72 | | | | |
| VRN3(3) | 19 | ♦ | | 34.86 | | | | 34.86 |
| VRN16 | 20 | ♦ | | 42.93 | | | | 26.32 |
| VRN17 | 21 | ♦ | | 42.5 | | | | 26.00 |
| VRN18 | 22 | ♦ | | 42.10 | | | | 25.80 |
| VRN19 | 23 | ♦ | | 41.50 | | | | 25.50 |
| VRN20 | 24 | ♦ | | 43.10 | | | | 26.60 |
| VRN8 | 25 | ♦ | | 45.32 | | | | 24.40 |
| VRN22 | 26 | ♦ | | 51.48 | | | | 31.56 |
| VRN23 | 27 | ♦ | | 46.70 | | | | 23.01 |
| VRN24 | 31 | * | | | | 69.71 | | |
| VRN25 | 32 | * | | | | | 69.71 | |
| VRN23$^{TTP}$ | 28 | ♦ | | 46.70 | | | | 23.01 |
| VRN36 | 29 | ♦ | | | 52.50 | | | 17.50 |
| VRN36$^{TTP}$ | 30 | ♦ | | | 52.50 | | | 17.50 |
| VRN37 | 33 | ● | | | | | | |
| VRN38 | 34 | ● | | | | | | |
| GST$^{lemon}$ | 11 | ● | | | 27.50 | | | |
| ADS4 | 1 | Δ | 87 | | | | | |
| ADS10 | 2 | Δ | | 87 | | | | |
| ADS20 | 3 | Δ | | | 87 | | | |
| ADS25 | 4 | Δ | | | | 87 | | |
| ADS36 | 5 | Δ | | | | | 87 | |

| | 342 Maltose | 1.80E+02 Glucose | 4443 Capsul | 1600 Q-Nat | 1916 Nadex | 100E+06 GA | % Oil | % Matrix | % Surfactant | Mn (g/mol) | Shelf life @ 20 C. |
|---|---|---|---|---|---|---|---|---|---|---|---|
| ALE04 | | | 8.4 | | | | 16.60 | 75.00 | 8.40 | 1612.39 | 0.91 |
| ALE51 | | | | | 8.4 | | 16.60 | 75.00 | 8.40 | 1081.30 | 2.27 |
| VRN3 | | | | 0.06 | | | 30.00 | 69.72 | 0.06 | 557.06 | 13.60 |
| VRN4 | | | | 0.12 | | | 30.00 | 69.46 | 0.12 | 556.79 | 13.57 |
| VRN5 | | | | 0.06 | | | 30.00 | 69.72 | 0.06 | 576.46 | 11.37 |
| VRN6 | | | 7.00 | | | | 30.00 | 63.00 | 7.00 | 610.76 | 8.08 |
| VRN3(2) | | | | 0.06 | | | 30.00 | 69.72 | 0.06 | 557.06 | 31.99 |
| VRN7 | | | | 0.06 | | | 30.00 | 69.72 | 0.06 | 894.53 | 7.46 |
| VKN8 | | | | 0.06 | | | 30.00 | 69.72 | 0.06 | 686.57 | 33.86 |
| VRN9 | | | 4.90 | | | | 30.00 | 65.10 | 4.90 | 921.15 | 4.82 |
| VRN10 | | | 4.90 | | | | 30.00 | 65.10 | 4.90 | 701.99 | 13.64 |
| VRN11 | | | | 0.06 | | | 30.00 | 69.72 | 0.06 | 1500.58 | 0.97 |
| VRN3(3) | | | | 0.06 | | | 30.00 | 69.72 | 0.06 | 557.06 | 22.38 |
| VRN16 | | | | 0.17 | | | 30.00 | 69.25 | 0.17 | 655.15 | 14.82 |
| VRN17 | | | | 0.33 | | | 30.00 | 68.50 | 0.33 | 654.28 | 16.00 |
| VRN18 | | | | 0.46 | | | 30.00 | 67.90 | 0.46 | 652.78 | 18.63 |
| VRN19 | | | | 0.66 | | | 30.00 | 67.00 | 0.66 | 650.51 | 13.59 |
| VRN20 | | | | 0.07 | | | 30.00 | 69.70 | 0.07 | 654.45 | 18.56 |
| VRN8 | | | | 0.06 | | | 30.00 | 69.72 | 0.06 | 686.58 | 5.76 |
| VRN22 | | | | 0.06 | | | 16.60 | 83.04 | 0.06 | 656.08 | 21.28 |
| VRN23 | | | | 0.06 | | | 30.00 | 69.71 | 0.06 | 708.42 | 4.40 |
| VRN24 | | | | 0.06 | | | 30.00 | 69.71 | 0.06 | 885.51 | 2.14 |
| VRN25 | | | | 0.06 | | | 30.00 | 69.71 | 0.06 | 729.79 | 5.50 |
| VRN23$^{TTP}$ | | | | 0.06 | | | 30.00 | 69.71 | 0.06 | 708.42 | 6.35 |
| VRN36 | | | | 0.06 | | | 30.00 | 70.00 | 0.06 | 685.07 | 4.89 |
| VRN6$^{TTP}$ | | | | 0.06 | | | 30.00 | 70.00 | 0.06 | 685.07 | 5.62 |
| VRN37 | 49 | | | | | 21 | 30.00 | 49.00 | 21.00 | 488.50 | 34.54 |
| VRN38 | 51.45 | | | | | 22.05 | 26.50 | 51.45 | 22.05 | 488.50 | 38.90 |
| GST$^{lemon}$ | | 5 | 20.00 | | | | 40.00 | 32.50 | 20.00 | 890.55 | 4.17 |
| ADS4 | | | | | | | 13.00 | 87.00 | 0.00 | 4150.65 | 0.28 |
| ADS10 | | | | | | | 13.00 | 87.00 | 0.00 | 1758.06 | 0.85 |
| ADS20 | | | | | | | 13.00 | 87.00 | 0.00 | 982.29 | 2.46 |
| ADS25 | | | | | | | 13.00 | 87.00 | 0.00 | 800.61 | 3.43 |
| ADS36 | | | | | | | 13.00 | 87.00 | 0.00 | 511.90 | 31.41 |

Accelerated Shelf Life Test

An accelerated shelf life test for oxidation was developed and used for evaluating the prototypes. It is based on the assumption that oxidation of the encapsulated oil is limited by the diffusion of oxygen through the carbohydrate barrier rather than the oxidation reaction itself. Products of the oxidation reaction were quantified after defined periods of time from 0 to 13 days.

Samples were placed in 15 ml glass vials with no cap, which were then placed into a Parr reactor (Parr Instrument Co., Moline, Il). The reactor was sealed and flushed with oxygen 4 times, then brought to 3.5 bars, sealed and placed in an oven at 35° C. On days 1, 3, 6 and 13 samples were taken for analysis and the reactor refilled with oxygen to continue to the next time point. For analysis 0.5 g of sample, 12.5 μl of internal standard solution (50 mg/ml chlorocyclohexane in acetone) and 1.5 ml water were placed in a 20 ml headspace vial, sealed and mixed to dissolve sample. The headspace was sampled using a purple 60μ×1 cm PEG SPME fiber (Sigma-Aldrich) for 20 min after equilibrating at 40° C. for 20 min. Desorption of the fiber in a 220° C. GC inlet for 5 min was followed by chromatography on a 0.32 mm×30 m×1 μm Restek Stabilwax column (Bellefonte, PA) with MS detection (Agilent 5975B, Santa Clara, CA). The GC oven (Agilent 6890) was programmed from 50° C. to 240° C. at 6° C./min after a 3 min initial hold, and held at final temperature for 10.3 min. Cis and trans limonene oxides, carvone, and cis and trans carveol were quantified by reference to the internal standard. The accelerated test required the powder sample to have a Tg higher than 50° C. DSC-measured glass transition temperatures ranged between 55° C. and 65° C. A high oxygen atmospheric pressure is used in the headspace to remove competition for diffusion within the glass and to increase the amount of oxygen diffusing into the matrix. This enhances the sensitivity of the test by maximizing the amount oxidation products. Tests were carried out at 35° C. to accelerate oxygen diffusion.

Molecular Weight in Number

Measurement of the number average molecular weight of maltodextrins was performed by osmometry using μ-Osmette 5400 freezing point osmometer (Precision Systems Inc., Natick, Mass., U.S.A.). Measurements were made following the manufacturers recommendations following calibration using 100 and 500 mOsm/kg$_{H2O}$ calibration fluids (Precision Systems Inc.). Fifty microliter samples were measured into specially designed sample vials. The instrument automatically determined osmolality via freezing point depression measurement.

The number average molecular weight of the carbohydrate matrix systems was calculated from individual ingredients using Equation 1.

$$Mn = \left(\sum_i w_i\right)\left(\sum_i \frac{w_i}{Mn_i}\right)^{-1} \quad \text{(Equation 1)}$$

An apparent DE was calculated for all samples using Equation 2.

$$DE_{app} = \frac{16'200}{Mn - 18} \quad \text{(Equation 2)}$$

Resistance to Humidity

The resistance to humidity was assessed by the measurement of $a_w^*$ at 25° C. [20] for glucose syrups and formulations containing a mixture of sucrose and maltodextrins. The $a_w^*$ is the value of the equilibrated water activity ($a_w$) for Tg equal to 25° C. Samples were equilibrated for 1 week at 25° C. in desiccators under controlled relative humidity conditions ranging from 10 to 80% relative humidity and analysed by DSC for Tg measurements.

Glass Transition Temperature ($T_g$) Measurements

Glass transition (Tg) measurements were conducted on a TA Instruments Q200 DSC previously calibrated with indium. Between 3-8 mg of sample was loaded into a Tzero aluminum hermetic pan. The pan was crimp sealed. The run conditions used were: hold at −20° C. for 5 min, ramp @ 10° C./min to 100° C. (scan 1), quench cool back to −20° C. and repeat ramp (scan 2). The Tg was calculated using the inflection point method on the second scan.

Results

Accelerated Shelf Life Test

Figure 1:
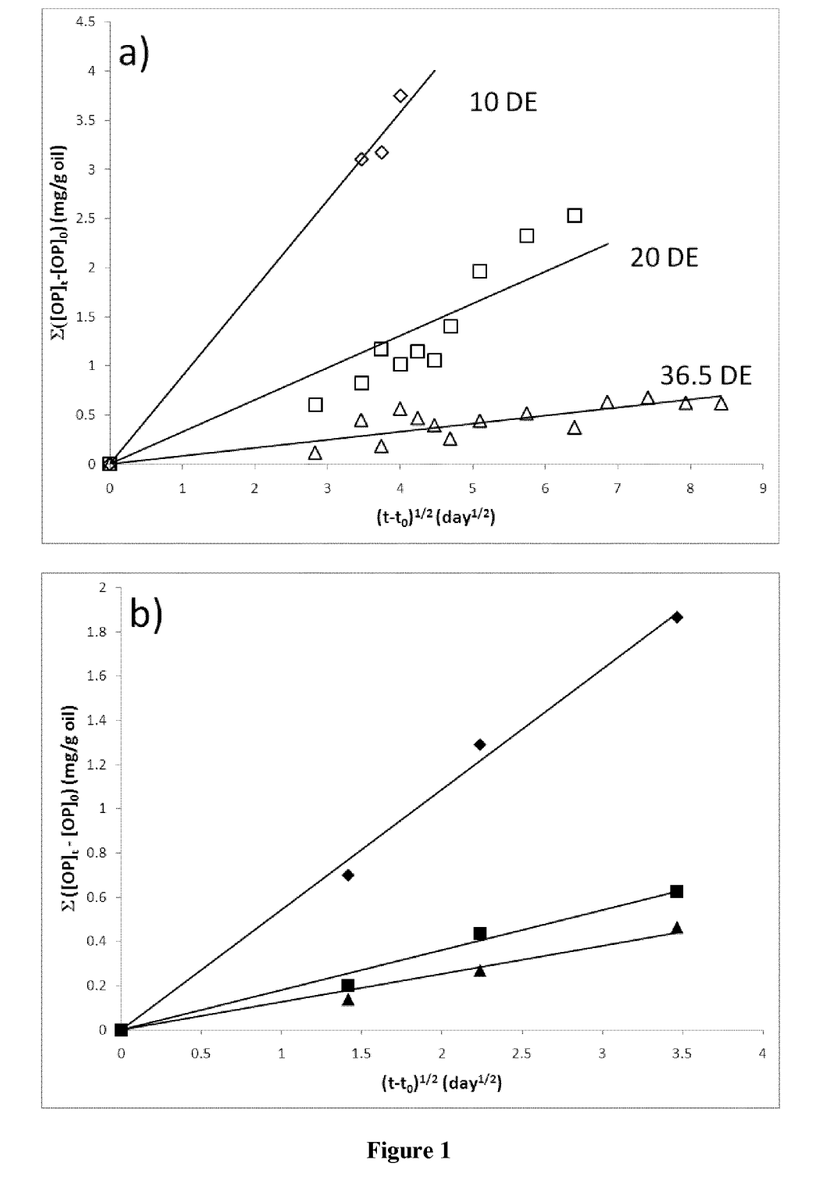

The products of limonene oxidation at a given time and under the accelerated test conditions (35° C., 3.5 bars O$_2$) are summed. The measured value at day 1 for the measurements of the compositions (or at day 7 for the data from the literature) was subtracted from subsequent measurements to remove the influence of the history of the sample (initial conditions). As shown in FIGS. 1a and b, the quantity of oxidation products increases with time, revealing a linear trend with the square root of the corrected time. This is typical of a diffusive process where the slope of the trend is related to the apparent oxygen diffusion coefficient $(2D_{app})^{1/2}$, see Equation 3 where OP stands for oxidation products.

$$\Sigma([OP]_t - [OP]_0) = \sqrt{2D_{app}(t-t_0)} \quad \text{(Equation 3)}$$

The results shown in FIGS. 1a and b are well corroborated with those from the literature. In these prior studies, oxidation was measured at 3 different temperatures (32, 45 and 60° C.) under ambient air atmosphere and for up to 78 days. FIG. 1a is a representation of published data measured at 32° C. and calculated with Equation 3. The loading was 13% w/w orange oil for all samples, and pure maltodextrins and glucose syrups of increasing DE were used with no emulsifier. The products of oxidation (OP in Equation 3) were measured using a GC-internal standard method on an extract of the samples. The data at various temperatures are easily fitted with an Arrhenius relationship where the logarithm of the sum of the products of oxidation is plotted linearly with the reciprocal of the absolute temperature. According to Fickian diffusion theory, the slopes of the representations in FIGS. 1a and b are each proportional to the square root of an apparent diffusion coefficient assuming that the surface area of the powder is not formulation dependent.

Oxidation Product Generation and Oxygen Penetration

Although the apparent diffusion coefficient calculated from the representations of FIGS. 1a and b could be linked to the diffusion of oxygen, a direct relationship between the development of oxidation products and the real penetration of oxygen through the matrix is missing. However, using the literature data (Anandaraman, S.; Reineccius, G. A. Stability of encapsulated orange peel oil, *Food Technology*, 1986, 40(11) 88-93 and Subramaniam, A. 1984, *Encapsulation, analysis and stability of orange peel oil.* PhD Thesis, University of Minnesota, St Paul, MN), this missing relationship can be approximated using storage at 45° C. and 60° C. and measured values of oxygen in the reported matrices and oxidation product generation (see FIG. 2). Due to the large range in the measured values on both axes, a log-log representation of the data looks more appropriate. The slope corresponds to the power-law of the direct relationship between the two quantities.

Figure 2:
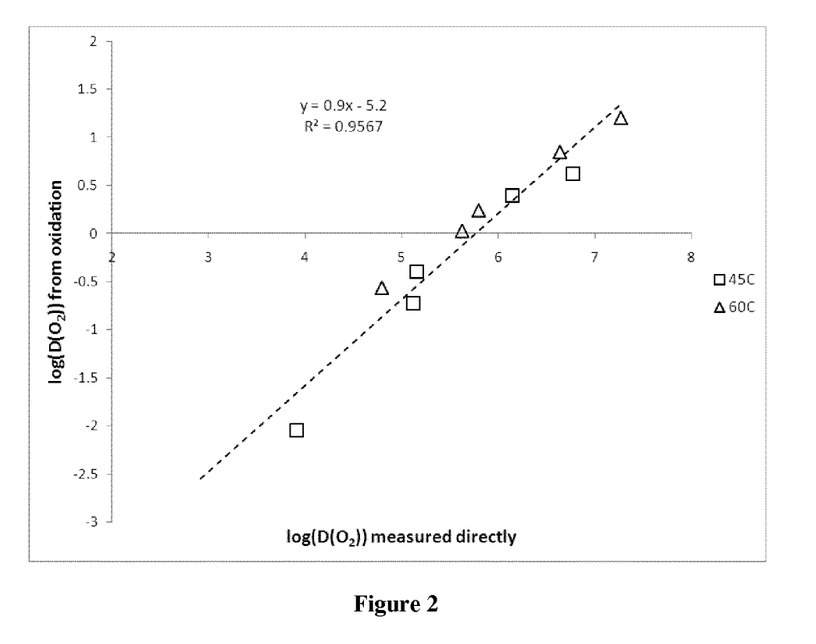
FIG. 2 is a graph showing the relationship between generation of oxidation products and oxygen penetration in the matrix. The slope of the log-log representation is close to 1 with a high regression coefficient.

According to FIG. 2, measuring the oxidation product concentration corresponds to measuring indirectly the penetration of oxygen through the matrix. Also, the square root relationship in FIGS. 1a and b demonstrates that the oxidation of encapsulated orange oil is limited by the diffusion of oxygen through the matrix.

Oxidation Product Generation and Shelf Life

Using the available literature data, a direct relationship can be observed between the logarithm of the shelf life as measured by trained panelists and the logarithm of the diffusion coefficient obtained from the analysis of the oxidation product generation. This relationship further links the oxidation product generation to the shelf life of the delivery systems, as shown in FIG. 3, where the three storage temperatures (32, 45 and 60° C.) are reported.

Figure 3:
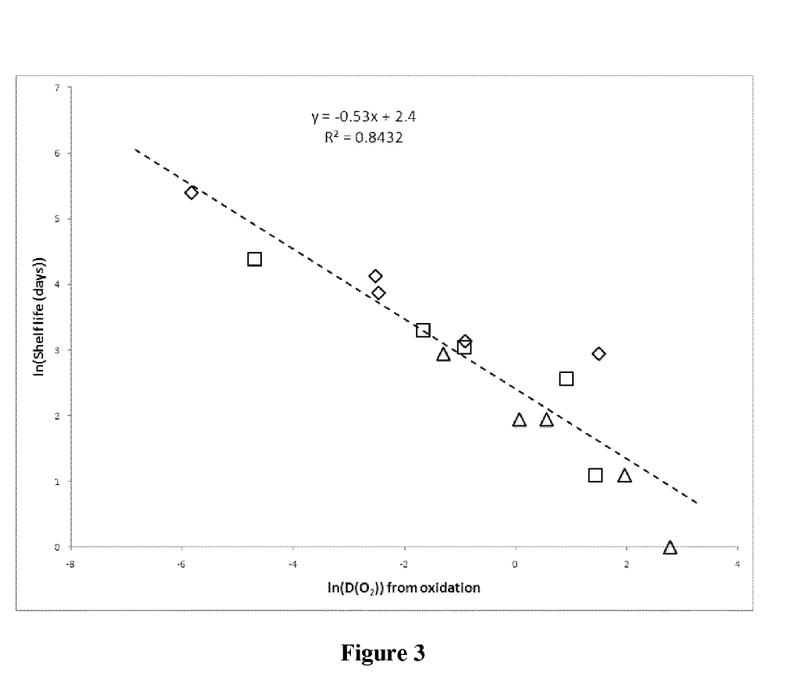
FIG. 3 is a graph showing the relationship between shelf life and the apparent oxygen diffusion coefficient derived from the measurement of oxidation product for 3 temperatures (32° C.: diamonds; 45° C.: squares; 60° C.: triangles). The shelf life of the delivery system is linked to the reciprocal of the square root of the diffusion of oxygen with a relatively high confidence (R2=0.84) considering that the data have been generated by a sensory panel.

From FIG. 3 and the embedded relationship, the shelf life can be used as a measure of oxidation product concentration rather than its evolution per se. The shelf life—oxygen diffusion coefficient relationship is neither temperature nor molecular weight distribution dependent, since one measurement of oxygen diffusion coefficient corresponds to one shelf life period and only one. It should be noted that the previous studies did not analyze the data in this way to allow the determination of the absolute performance of delivery systems against oxidation.

Using an Arrhenius representation, the extrapolation of the literature data to 35° C. was successfully realized for maltopolymers. Those calculated values for carbohydrates of homologous structures are compared in the following sections to experimental values for matrices based on carbohydrates of non-homologous structures.

Effect of Matrix Molecular Weight Distribution on Oxidation Product Generation

The apparent oxygen diffusion coefficient was determined as a function of the number average molecular weight of all species present in the matrix, assuming that all matrices were in a glassy state. Samples of compositions reported in Table 1 were considered to evaluate their apparent oxygen diffusion coefficient at 35° C., with the results for all samples presented in FIG. 4. The open triangles are extrapolated values at 35° C. from the Arrhenius representation of values at 32° C., 45° C. and 60° C.

TABLE 3

Figure 4:
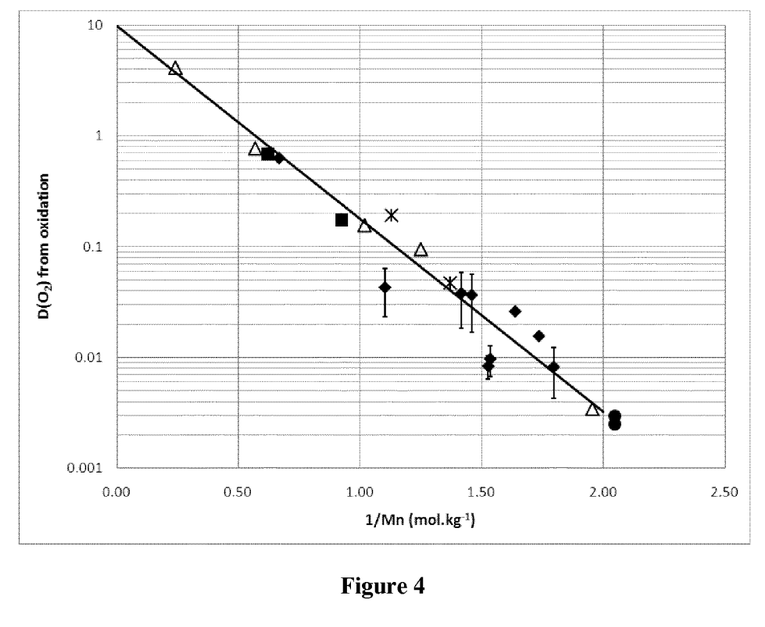
FIG. 4 is a graph showing effect of number average molecular weight on the apparent diffusion coefficient of oxygen at 35° C. in spray dry powders loaded with various amounts of orange oil, and containing various amounts of sucrose, different DE maltodextrins and different emulsifier quantity and nature.

Composition of spray dry samples represented in FIG. 4

| Symbol | Matrix | Emulsifier | [orange oil] | Samples | Source |
|---|---|---|---|---|---|
| Δ | Maltodextrins | — | 13% w/w | 5 | Ref#12 |
| ■ | Maltodextrins | OSS | 16.6% w/w | 2 | This study |
| ♦ | Maltodextrin-sucrose | Saponin | 30% w/w | 19 | This study |
| * | Glucose Syrups | Saponin | 30% w/w | 4 | This study |
| ● | Maltose | Gum Arabic | 20% w/w | 2 | This study |
| ◊ | Maltodextrin-sucrose | — | 0% w/w | 4 | Ref#20 |

As shown in FIG. 4, a satisfactory negative correlation exists between the logarithm of the diffusion coefficient and the reciprocal of the number average molecular weight of the matrix. The higher the molecular weight, the faster is the diffusion of oxygen. Data from the literature are included with the results from the current study.

Absolute Shelf Life Values

The representation of FIG. 4 can be translated into absolute shelf life stability using the relationship expressed in FIG. 3 after a slight transformation. The oxygen diffusion is measured at 35° C., but a shelf life prediction at 25° C. will be more useful for stability under realistic industrial storage conditions. Again, extrapolating data measured at three different temperatures generates a direct relationship between the oxygen diffusion coefficient estimated at 35° C. and the one predicted at 25° C. (see FIG. 5).

Figure 5:
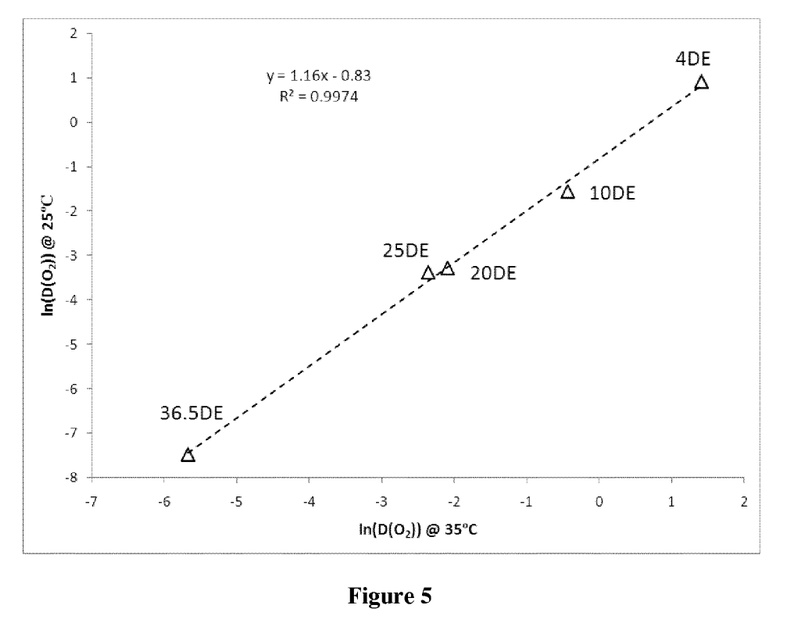
FIG. 5 is a graph showing the relationship between the estimated oxygen coefficients of diffusion at two different temperatures for the 5 matrices as reported in Anandaraman et al., Stability of encapsulated orange peel oil, *Food Technology*, 1986, 40(11) 88-93.

From the linear relationship expressed in FIG. 5, the diffusion coefficient at 25° C. can be estimated from the diffusion coefficient measured at 35° C. Then, from the linear regression shown in FIG. 3, the shelf life at 25° C. or at any other temperature can be estimated.

A useful representation to easily capture the value of this study is to express the absolute shelf life stability period as a function of the inverse of the molecular weight in number under various temperature conditions relevant for product or application storage. The resulting relationship for shelf life at 20° C. vs $M_n$ (FIG. 6a) allows the formulation of a carbohydrate matrix with the desired "absolute" shelf life.

According to the Arrhenius dependence of shelf life and oxidation product generation, the shelf life data at 20° C. can be extrapolated to other temperatures. A simplification is to represent the diffusion coefficient as measured from the oxidation product formation at 35° C. against the extrapolated values obtained at another temperature from the Arrhenius dependency. The shelf life is decreased consistently by a factor of 1.6 if the temperature of storage is 25° C. rather than 20° C., which leads to the representation in FIG. 6b where the accelerated shelf life test at 35° C. is used to predict the shelf life upon storage at 20° C. Using the prediction in FIG. 6a, a two year shelf life at 20° C. can be achieved for glucose syrup carrier systems having a DE of 25 to 30.

Tradeoffs for Improved Stability to Oxidation

A strong relationship between the molecular weight of the carrier and the stability to humid air conditions has been previously reported in literature using the experimental determination of the critical water activity. This reported study dealt with mixtures of various sugar dimers and maltodextrins and data was expressed as a function of added sugar dimers to the maltodextrin. Representing the data as a function of an apparent DE rather than the percentage of added sucrose reveals a linear relationship over the entire range of apparent DE investigated. The apparent DE is in fact directly related to the degree of polymerisation of the sugar residues (DE=100/DP), or to the number average molecular weight ($M_n$=162DP+18). The term "apparent DE" is used, because "true DE" cannot be measured in mixtures of maltodextrins and sucrose using the standard copper (II) sulphate titration procedure, as sucrose does not possess any titratable reducing end. As reported, the slope of the relationship is dependent on the matrix composition. The $a_w$* decreases rapidly if sucrose is added to the maltodextrin whereas the mixture of maltodextrin and maltose shows a less dramatic effect, demonstrating an improved resistance to humid conditions. Working with apparent DE has the advantage of allowing selection of the best maltopolymer molecular weight distribution to achieve both an improved resistance to oxidation and an acceptable behaviour under humid conditions.

Figure 6:
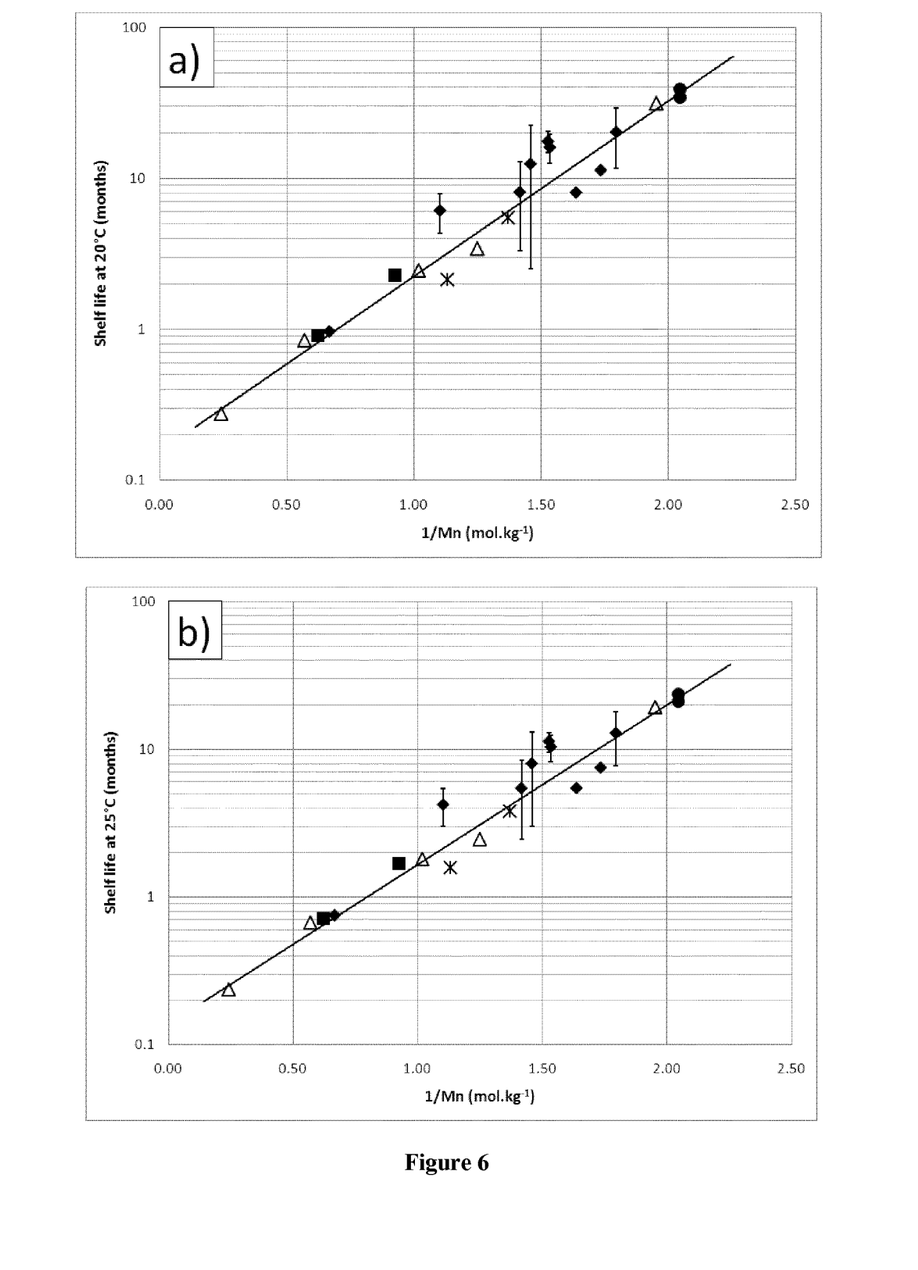
Figure 7:
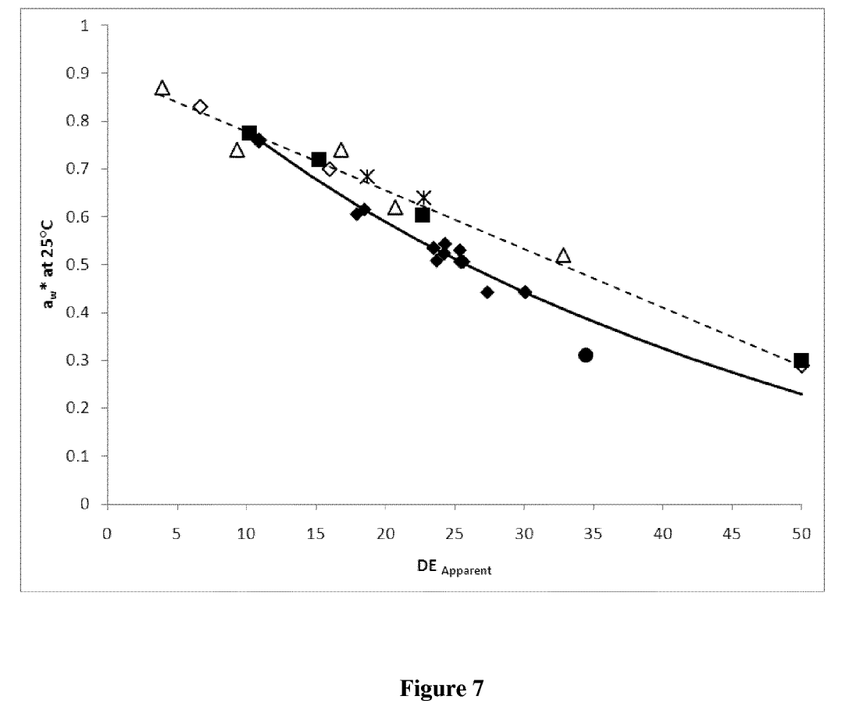
FIG. 7 is a graph showing physical stability to humid air conditions at 25° C. for compositions corresponding to Table 1 and taken from the literature. Open diamonds are data from ref #20, dotted line is the extrapolation for maltose, and the solid curve is the calculation for aw* using the model in ref #20 for sucrose-containing formulations with a k parameter of 1.5.

A 25DE corn syrup shows a stability to 60.4% RH whereas a mixture of 10DE:sucrose 2:1 shows a stability to 53% RH for a similar average molecular weight (see FIG. 7a). FIGS. 6a and b show that the sample made of maltose and Gum Arabic was the most stable to oxidation, but this sample is physically stable only in an exceptionally dry and cold environment (see FIGS. 7a and b). According to the measurements, the Gum Arabic-containing sample, even though it was used at 30% w/w in the matrix (70% w/w maltose), does not improve the physical stability compared to pure maltose. The presence of orange oil does not affect the moisture sorption properties of the carrier. Finally, throughout the duration of the project (around 6 months), none of the samples prepared showed caking when stored in conventional packaging in an office area except the sample made of maltose and Gum Arabic (see Table 3), which formed aggregates in a period of less than one month. Also, the samples made of the highest apparent DE have shown little to no discolouration compared to the samples made of the lowest apparent DE, thus demonstrating a visual improved resistance to oxidation.

The analyses presented hereinabove suggest a model that allows the prediction of shelf life for oxidation-sensitive spray-dried flavours. In this regard, the $M_n$ of the matrix is the determinant of oxygen permeation and thus oxidative stability. The higher the apparent DE, the better the oxidative stability is, but the higher the apparent DE, the lower the resistance is to humid air. Therefore, as disclosed herein a compromise is necessary to produce an acceptable shelf-stable product.

A suitable surfactant (Q-NATURALE™) has been selected that is efficient at a very low concentration which allows the matrix properties to be preserved and predictable. Citrus spray dry powders with a predicted two year absolute shelf life can be generated using a simple combination of ingredients in the matrix without antioxidants.

The invention claimed is:

1. A dry particle comprising:
    i) an emulsifier in an amount, by weight, from about 0.06% to about 1% of the total weight of the dry particle wherein the emulsifier comprises a natural extract containing saponins, with the saponins present in an amount of less than 0.5% by weight of the total weight of the dry particle;
    ii) a carbohydrate in an amount, by weight, from about 15% to about 95% by weight of the total weight of the dry particle wherein the carbohydrate comprises a mixture of maltodextrins and sucrose and has a number average molecular weight of from 445 to about 687 g·mol-1, wherein the maltodextrins and the sucrose are present in a ratio in a range of from about 4:1 to about 2:1, wherein the carbohydrate has an apparent Dextrose Equivalent of at least 22.7;
    iii) an oxidizable flavor or fragrance in an amount, by weight, from about 5% to about 75% by weight of the total weight of the dry particle; and
    iv) a polymeric emulsifier, wherein the polymeric emulsifier is present in an amount, by weight, of not more than 10% of the total weight of the dry particle;
    wherein the dry particle does not comprise an antioxidant; and
    wherein the dry particle has a shelf life of at least 6 months at 25° C. when the dry particle is stored at 10-80% relative humidity, with the shelf life determined by a measurement of oxidation products of the oxidizable flavor or fragrance to determine an apparent diffusion coefficient of oxygen of the dry particle.

2. The dry particle of claim 1 comprising from about 0.06% to about 0.1% emulsifier.

3. The dry particle of claim 1 comprising about 0.06% emulsifier.

4. The dry particle of claim 1 wherein the flavor is citrus flavor.

5. The dry particle of claim 4 wherein the citrus flavor is orange.

6. The dry particle of claim 1 wherein the particle has a shelf life of at least 8 months at 25° C.

7. The dry particle of claim 6 wherein the particle has a shelf life of from about 12 months to about 24 months at 25° C.

8. The dry particle of claim 6 wherein the particle has a shelf life of from about 12 months to about 18 months at 25° C.

9. A dry particle prepared by a method comprising:
    a) preparing an emulsion comprising:
        i) an emulsifier in an amount, by weight, from greater than 0% to about 1% of the total weight of the emulsion wherein the emulsifier comprises a natural extract containing saponins, with the saponins present in an amount, by dry weight, of from about 0.06% to about 0.1% of the total weight of the dry particle;
        ii) a carbohydrate in an amount, by weight, from about 5 to about 55% of the total weight of the emulsion wherein the carbohydrate comprises a mixture of maltodextrins and sucrose and has a number average molecular weight of from 445 to about 687 g·mol-1, wherein the maltodextrins and the sucrose are present in a ratio in a range of from about 4:1 to about 2:1;
        iii) an oxidizable citrus flavor in an amount, by weight, from about 5 to about 60% of the total weight of the emulsion; and
        iv) a polymeric emulsifier, wherein the polymeric emulsifier is present in an amount, by weight, not more than 10% of the total weight of the emulsion, and
    b) drying the emulsion to obtain the dry particle, wherein the dry particle has a shelf life of at least 6 months at 25° C. when the dry particle is stored at 10-80% relative humidity, with the shelf life determined by a measurement of oxidation products of the oxidizable flavor or fragrance to determine an apparent diffusion coefficient of oxygen of the dry particle wherein the dry particle comprises:
        i) an emulsifier in an amount, by weight, from about 0.06% to about 1% of the total weight of the dry particle wherein the emulsifier comprises a natural extract containing saponins, with the saponins present in an amount of less than 0.5% by weight of the total weight of the dry particle;
        ii) a carbohydrate in an amount, by weight, from about 15% to about 95% by weight of the total weight of the dry particle wherein the carbohydrate comprises a mixture of maltodextrins and sucrose and has a number average molecular weight of from 445 to about 687 g·mol-1, wherein the carbohydrate has an apparent Dextrose Equivalent of at least 22.7;
        iii) an oxidizable flavor or fragrance in an amount, by weight, from about 5% to about 75% by weight of the total weight of the dry particle; and
        iv) a polymeric emulsifier in an amount, by weight, of not more than 10% of the total weight of the dry particle;
        wherein the dry particle does not comprise an antioxidant; and wherein the dry particle has a shelf life of at least 6 months at 25° C. when the dry particle is stored at 10-80% relative humidity, with the shelf life determined by a measurement of oxidation products of the oxidizable flavor or fragrance to determine an apparent diffusion coefficient of oxygen of the dry particle.

10. The dry particle of claim 9 comprising from about 0.06% to about 0.1% emulsifier.

11. The dry particle of claim 9 comprising about 0.06% emulsifier.

12. The dry particle of claim 9 wherein the flavor is citrus flavor.

13. The dry particle of claim 12 wherein the citrus flavor is orange.

14. The dry particle of claim 9 wherein the particle has a shelf life of at least 8 months at 25° C.

15. The dry particle of claim 14 wherein the particle has a shelf life of from about 12 months to about 24 months at 25° C.

16. The dry particle of claim 14 wherein the particle has a shelf life of from about 12 months to about 18 months at 25° C.

* * * * *